E. A. WRIGHT.
Wheel-Cultivator.
No. 222,767. Patented Dec. 16, 1879.
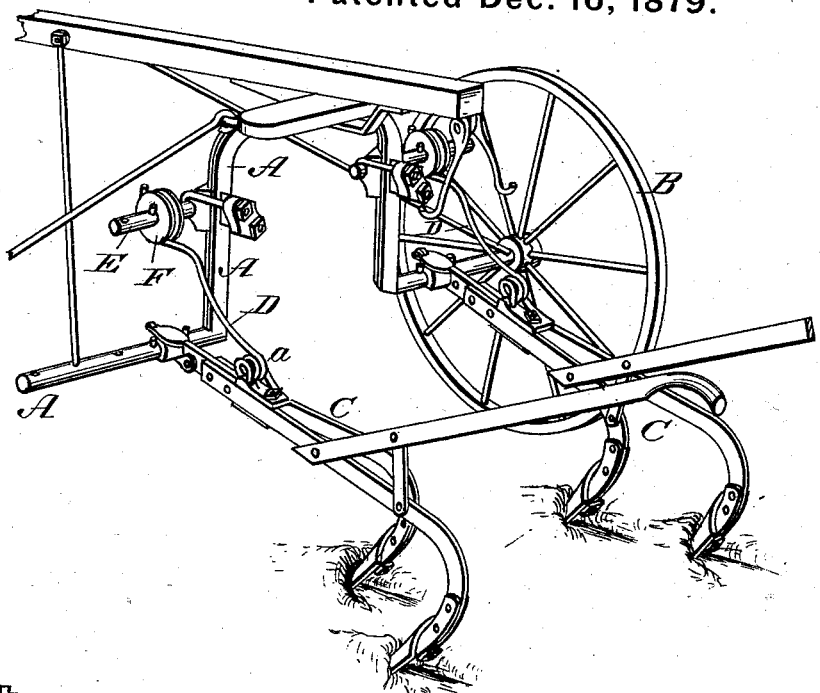
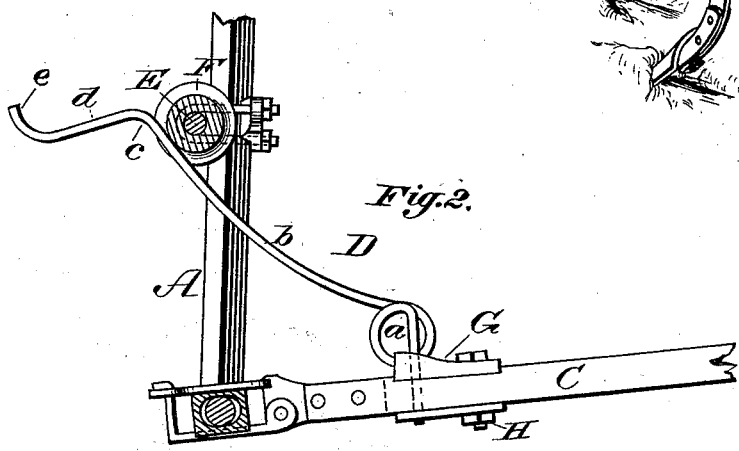
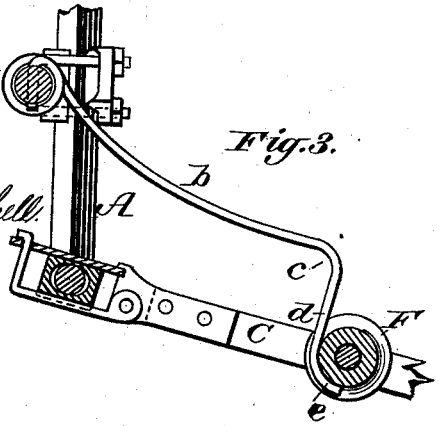
Witnesses:
Donn J. Twitchell
W. W. Dodge
Inventor:
E. A. Wright
By his Atty's
Dodge & Son E. A. WRIGHT.
Wheel-Cultivator.

No. 222,767. Patented Dec. 16, 1879.

Witnesses:
Donn J. Twitchell.
W. W. Dodge

Inventor:
E. A. Wright
By his Attys.
Dodge & Son

UNITED STATES PATENT OFFICE.

EDGAR A. WRIGHT, OF DAVENPORT, IOWA.

IMPROVEMENT IN WHEEL-CULTIVATORS.

Specification forming part of Letters Patent No. 222,767, dated December 16, 1879; application filed November 12, 1879.

*To all whom it may concern:*

Be it known that I, EDGAR A. WRIGHT, of Davenport, in the county of Scott and State of Iowa, have invented certain Improvements in Wheeled Cultivators, of which the following is a specification.

The object of my invention is to give the operator mechanical assistance in raising and lowering the plows without interfering with their usual action and movement, to prevent the plows from rising out of the ground accidentally, and to limit their descent; and to this end the invention consists in a spring which serves the double purpose of lifting or holding down the plows at will, as may be required; in so constructing and applying a spring that it exerts a lifting action on the plow only when the latter is raised above its usual operative position; in so constructing and applying a spring that it limits the descent of the plow; also, in details of minor importance, hereinafter described.

In carrying out my invention the one spring may be adapted to serve all or either one or more of the offices above enumerated, and may be modified in its form, construction, and arrangement, as desired, provided its mode of action is retained.

The drawings represent the construction and arrangement considered the best; but it is to be clearly understood that they represent but one of the many forms in which the invention may be embodied.

The invention is shown in connection with an ordinary two-wheeled walking-cultivator, but may be applied to any machine of similar character, or to a sulky-plow or other machine employing vertically-moving plows, shovels, beams, or teeth, which require to be elevated by the attendant.

Figure 4:
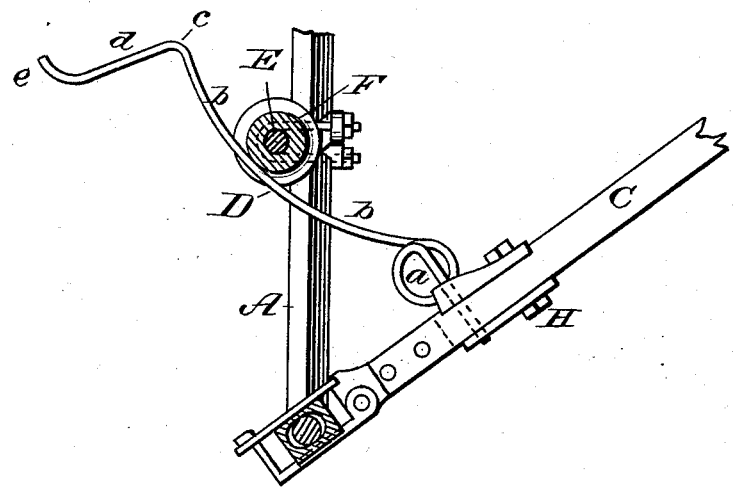
Figure 5:
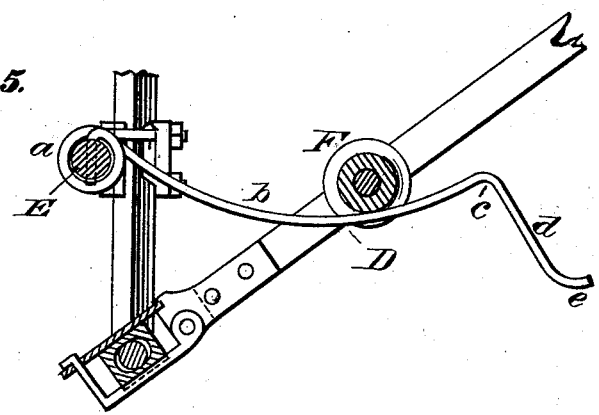

Figure 1 is a perspective view of a cultivator containing my improvement, one wheel being removed in order to expose the other parts, and the plows being shown down in their operative positions. Fig. 2 is a longitudinal vertical section, showing the parts arranged as on the left in Fig. 1, and the beam or plow slightly raised; Fig. 3, a similar section, showing a reversed arrangement of parts, the spring being attached to the axle instead of the plow-beam; Fig. 4, a section showing the same arrangement of parts as in Fig. 2, but with the beam raised to or nearly to its highest position; Fig. 5, a like view of the arrangement shown in Fig. 3.

A represents the arched iron axle or frame; B, the main wheels applied to the ends of the axle; and C C, the plow or cultivator beams, connected by couplings to the ends of the axle in such manner that they are free to swing both vertically and laterally, as usual. D D represent my improved springs, which may be attached either to the plows, as shown in Figs. 1 and 2, or to the axle, as shown in Fig. 3.

As shown in Figs. 2 and 3, each spring consists of a round steel rod or wire having at the fixed end a coil, $a$, and extending from the coil a long slightly-curved arm, $b$, the outer end of which terminates in a sharp bend or shoulder, $c$, from which the rod continues to form a short arm, $d$, the end of which has a sharp bend or curl, $e$, as represented in Figs. 2 and 3.

When the spring is to be applied to the plow-beam, as shown in Figs. 1 and 2, I first provide the upright portion of the axle with an outwardly-extending arm or rod, E, carrying a laterally-adjustable grooved roller, F, to serve as a bearing for the free end of the spring. The coiled end of the spring is then seated in a metal bearing-plate, G, which is secured rigidly but adjustably to the beam by means of a bolt, H, as shown, the free end of the spring being at the same time seated against the under side of the roller, and the parts so adjusted that when the beam is in its lowermost position the extreme end $e$ of the spring will bear against the front of the roller, and the spring be under a strong tension.

When the beam and its shovels are down in an operative position, so that the shovels enter the ground, the portion $d$ of the spring bears beneath the roller, as shown in Fig. 1, and serves to hold the beam down, so as to keep the shovels in the ground, but at the same time allows them a limited vertical movement when required.

Whenever the shovels enter to the full depth desired the end $e$ of the spring encounters the roller, and serves to check the descent and to suspend the beams.

When the beam is raised the spring continues to urge or hold them down until the bend or angle *c* of the spring passes the roller, whereupon the spring instantly changes its action, and tends to lift the beam.

By a proper adjustment of the parts the spring may be caused to exert a greater or less force upward upon the beam; but in practice I usually cause the spring to raise the entire weight of the beam and shovel, and lift them to the point at which they are usually carried when not in action. This being the case, the attendant is relieved entirely of the labor of lifting the plow, and at the same time a gentle pressure suffices to depress the plow to the point at which the spring holds it down.

It will be noted that as the beam rises the free end of the spring passes forward under the roller, so that the active portion of the spring is shortened and the point of bearing brought nearer the fixed end, whereby the spring is caused to act with increasing force or effect as the beams leave the ground. Of course the spring loses tension as the beam is elevated; but the gain in consequence of the shortening of the active portion more than compensates for the loss named, and thus it is that the increasing effect is secured.

While the above-described arrangement is preferred, the arrangement shown in Figs. 3 and 5 may be used with the same results. It differs from the first arrangement merely in having the parts reversed and the spring attached to the frame or axle to act beneath a roller on the beam.

When the shovels are in action they are kept down through the medium of the part *d*, and limited in their descent by the end *e*; but as the beam is lifted the roller passes the angle *c*, and the spring then exerts its lifting action.

It will be noted that in each arrangement the spring and the roller are made adjustable with relation to each other and to the frame and beam. This permits the action of the spring to be increased or diminished in force, and also permits a change in the points to which the shovels ascend and descend, and in the working depth of the shovels.

I am aware that cultivator-plows have been heretofore suspended when in action by springs which exerted little or no lifting force when the shovels were raised above the ground, and which exerted an increasing lifting force as the shovels descended.

I am also aware that springs actuated by manual devices, and not automatic, have been employed to force cultivator-shovels into the ground.

I am not aware, however, that any one has hitherto applied a spring in such manner that it served both to elevate and hold down the beam or shovels, nor that any one has suspended the beams by a spring which would lift the whole or the greater part of the weight to the highest point required and still permit an easy motion of the shovels in the ground with little or no tendency to rise therefrom; neither am I aware that any one has ever caused a lifting or depressing spring, which permitted a movement of the beam and shovels, to limit their descent.

I therefore claim to be the inventor of each and all of said features, broadly considered; and it is obvious that they may be changed, modified, or altered in the form of embodiment, as desired, it being obvious to the skilled mechanic that there are many equivalent ways of securing the same end without departing from the limits of my invention.

I do not claim in the present patent the broad idea of a lifting-spring which acts with increasing force as the beam rises, as I have made the same the subject of a separate application bearing date prior hereto; but, Having described my invention, what I do claim is—

1. In combination with a vertically-swinging beam or drag-bar, a spring, substantially as described and shown, arranged to urge the beam downward when in action and urge it upward when it is lifted above the operative position.

2. In combination with a vertically-swinging beam or drag-bar, a double-acting automatic spring, substantially as described, serving the double purpose of holding the beam down to its work and of assisting to lift it when it is thrown out of action.

3. In combination with a vertically-swinging beam or drag-bar, a spring, substantially as shown, adapted to exert an automatic spring action upward or downward upon the beam, according to the position of the latter.

4. In a cultivator, the combination of a frame, a vertically-swinging beam or drag-bar attached thereto, and an automatic spring, substantially as described, connected with one of said members, and arranged to urge the beam downward while the latter is in an operative position, but not when it is raised above said position.

5. In a cultivator, the combination of a frame, a vertically-moving beam or drag-bar connected thereto, the pulley or equivalent bearing connected to one of said members, and the spring-arm connected to the other member and provided with the portion *d*, bent as shown, and adapted to act against the pulley and hold the beam down in an operative position.

6. In a cultivator, the combination of a main frame, a vertically-moving beam or drag-bar connected therewith, and a spring, substantially as described, interposed between said parts and acting vertically upon the beam, said spring being constructed and arranged to pass a center or dead point as the beam moves vertically, and in passing said point cease or change the direction of its action on the beam.

7. The combination of the frame, the vertically-moving beam, and the vibrating spring having the portion as shown and described, adapted to urge the beam upward after the latter has risen above its operative position, but not urge it upward when it is in said operative position.

8. The combination of the frame, the vertically-moving beam or drag-bar, the roller or equivalent bearing connected to one of said members, and a vibrating spring, constructed substantially as described, adjustably secured to the other of said members, as shown, whereby the operative position of the beam and the action of the spring may be varied.

9. The combination of the frame, the vertically-moving beam, the vibrating spring, constructed substantially as shown, attached to one of said members, and the roller or bearing adjustably connected with the other member, as shown, whereby the action of the spring and position of the beam may be modified.

10. The combination of the main frame, the vertically-movable beam, and the automatic vibrating spring provided with shoulder $e$, said spring being located between the frame and beam in the manner shown and described, so that the shoulder $e$ serves to limit the descent of the beam, and thereby control the depth to which the plow or hoe enters the ground.

11. In a wheeled cultivator, the combination of an arched axle and an arm extending outwardly therefrom, and adapted to co-operate with and permit the lateral adjustment of a spring operating upon the beam, substantially as described.

12. In a cultivator, the combination of a frame, a vertically-swinging beam, a vibrating lifting-spring or spring-arm, and a roller or equivalent bearing riding on the spring, said parts arranged, substantially as described, so that the distance between the roller and the fixed end of the spring decreases as the beam rises.

E. A. WRIGHT.

Witnesses:
P. T. DODGE,
WILLIAM W. DODGE.